United States Patent
Kishima et al.

(10) Patent No.: US 9,290,208 B2
(45) Date of Patent: Mar. 22, 2016

(54) VEHICLE BODY LOWER PORTION STRUCTURE

(75) Inventors: Fumihiko Kishima, Konan (JP); Kazuya Koizumi, Iwata (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 14/363,039

(22) PCT Filed: Dec. 7, 2011

(86) PCT No.: PCT/JP2011/078346
§ 371 (c)(1),
(2), (4) Date: Jun. 5, 2014

(87) PCT Pub. No.: WO2013/084324
PCT Pub. Date: Jun. 13, 2013

(65) Prior Publication Data
US 2014/0327271 A1  Nov. 6, 2014

(51) Int. Cl.
*B62D 25/20* (2006.01)
*B60R 16/02* (2006.01)

(52) U.S. Cl.
CPC ........ *B62D 25/2036* (2013.01); *B60R 16/0215* (2013.01); *B62D 25/2045* (2013.01)

(58) Field of Classification Search
CPC .............................. B62D 21/15; B62D 25/20
USPC ............... 296/187.1, 193.05, 193.07, 187.01, 296/182.02, 187.03, 187.05, 187.12, 187.08
See application file for complete search history.

(56) References Cited

U.S. PATENT DOCUMENTS 5,332,281 A * 7/1994 Janotik et al. ................. 296/209
5,480,208 A * 1/1996 Cobes et al. ............. 296/203.01
(Continued)

FOREIGN PATENT DOCUMENTS

| EP | 2 647 554 | 10/2013 |
|----|-----------|---------|
| JP | 52-6311 | 1/1977 |

(Continued)

*Primary Examiner* — Pinel Romain
(74) *Attorney, Agent, or Firm* — Finnegan, Henderson, Farabow, Garrett & Dunner, LLP

(57) ABSTRACT

It is a subject of the present invention to ensure foot space for an occupant and lower a side portion of a floor portion. A vehicle body lower portion structure (10) comprises: a rocker upper member (16) that configures an upper portion of a rocker (12) and has an upper wall portion (16A) that extends in a vehicle width direction, an inner wall portion (16B) that is positioned at a vehicle width direction inner side and a vehicle lower side with respect to the upper wall portion (16A) and extends in a vehicle up-and-down direction, and a connecting wall portion (16D) that interconnects a vehicle width direction inside end portion of the upper wall portion (16A) and an upper end portion of the inner wall portion (16B); a rocker lower member (18) that configures a lower portion of the rocker (12); and a wire harness (28) that extends in a vehicle front-and-rear direction along the rocker (12), with at least part (28A) of the wire harness (28) being positioned, as seen in a vehicle front view, in a cross section formed by the connecting wall portion (16D), an extension line (16E) extending inward in the vehicle width direction from the upper wall portion (16A), and an extension line (16F) extending toward a vehicle upper side from the inner wall portion (16B).

8 Claims, 6 Drawing Sheets

(56) References Cited

U.S. PATENT DOCUMENTS

| | | | |
|---|---|---|---|
| 6,053,564 A * | 4/2000 | Kamata et al. | 296/187.09 |
| 6,786,534 B1 * | 9/2004 | Peng | 296/187.08 |
| 7,001,097 B2 * | 2/2006 | Wang et al. | 403/231 |
| 7,644,978 B2 * | 1/2010 | Tosaka et al. | 296/187.12 |
| 7,753,437 B2 * | 7/2010 | Klimek | 296/187.08 |
| 7,963,588 B2 * | 6/2011 | Kanagai et al. | 296/187.12 |
| 8,066,322 B2 * | 11/2011 | Mori | 296/187.03 |
| 8,235,458 B2 * | 8/2012 | Mori | 296/193.06 |
| 8,262,152 B2 * | 9/2012 | Okumura et al. | 296/193.06 |
| 2010/0123337 A1 * | 5/2010 | Tamura et al. | 296/203.03 |
| 2010/0270830 A1 * | 10/2010 | Maruyama | 296/209 |
| 2013/0049408 A1 * | 2/2013 | Kurogi et al. | 296/209 |
| 2014/0333093 A1 * | 11/2014 | Matsuura et al. | 296/187.12 |

FOREIGN PATENT DOCUMENTS

| | | |
|---|---|---|
| JP | 59-8941 | 3/1984 |
| JP | 59-110275 | 7/1984 |
| JP | 62-127069 | 8/1987 |
| JP | 3-71980 | 7/1991 |
| JP | 6-27452 | 4/1994 |
| JP | 7-89451 | 4/1995 |
| JP | 7-117729 | 5/1995 |
| JP | 8-58617 | 3/1996 |
| JP | 10-194155 | 7/1998 |
| JP | 10-258670 | 9/1998 |
| JP | 2000-211549 | 8/2000 |
| JP | 2010-120418 | 6/2010 |
| JP | 5288054 | 6/2013 |

* cited by examiner

VEHICLE BODY LOWER PORTION STRUCTURE

CROSS-REFERENCE TO RELATED APPLICATIONS

This application is a national phase application of International Application No. PCT/JP2011/078346, filed Dec. 7, 2011, the content of which is incorporated herein by reference.

TECHNICAL FIELD

The present invention relates to a vehicle body lower portion structure.

BACKGROUND ART

Conventionally, a structure equipped with a side sill having a side sill upper member and a side sill lower member that are divided in the vehicle up-and-down direction has been known, for example, as disclosed in patent citation 1 (Japanese Utility Model Application Laid-Open (JP-U) No. H06-27452).

PRIOR ART LIST

Patent Citation 1: Japanese Utility Model Application Laid-Open (JP-U) No. H06-27452
Patent Citation 2: Japanese Patent Application Laid-Open (JP -A) No. H10-258670
Patent Citation 3: JP-U No. S59-110275
Patent Citation 4: JP-A No. H07-117729
Patent Citation 5: JP-A No. 2000-211549

SUMMARY OF INVENTION

Technical Subject

However, in this side sill structure, for example, in a case where a wire harness extends along the side sill, there are the concerns that a foot space for an occupant becomes narrower and a side portion (rocker portion) of a floor portion becomes higher.

The present invention has been made in view of the above circumstances, and it is a subject thereof to provide a vehicle body lower portion structure with which the foot space for an occupant can be ensured and the side portion of the floor portion can be lowered.

Solution Addressing Subject

In order to address the above subject, a vehicle body lower portion structure pertaining to a first aspect of the present invention comprises: a rocker upper member that configures an upper portion of a rocker that is disposed on a side portion of a floor portion of a cabin, extends in a vehicle front-and-rear direction, and has a closed cross section as cut along a vehicle width direction, the rocker upper member having an upper wall portion that extends in the vehicle width direction, an inner wall portion that is positioned at a vehicle width direction inner side and a vehicle lower side with respect to the upper wall portion and extends in a vehicle up-and-down direction, and a connecting wall portion that interconnects a vehicle width direction inside end portion of the upper wall portion and an upper end portion of the inner wall portion; a rocker lower member that configures a lower portion. of the rocker; and a wire harness that extends in the vehicle front-and-ear direction along the rocker, with at least part of the wire harness being positioned, as seen in a vehicle front view, in a cross section formed by the connecting wall portion, an extension line extending inward in the vehicle width direction from the upper wall portion, and an extension line extending toward a vehicle upper side from the inner wall portion.

According to the vehicle body lower portion structure, the rocker upper member that configures the upper portion of the rocker has the upper wall portion, the inner wall portion that is positioned at the vehicle width direction inner side and the vehicle lower side with respect to the vehicle width direction inside end potion of the upper wall portion, and the connecting wall portion that interconnects the vehicle width direction inside end portion of the upper wall portion and the upper end portion of the inner wall portion. Further, the wire harness extends in the vehicle front-and-rear direction along the rocker, and at least part of the wire harness is positioned, as seen in a vehicle front view, in the cross section formed by the connecting wall portion, the extension line extending inward in the vehicle width direction from the upper wall portion, and the extension line extending toward the vehicle upper side from the inner wall portion.

Consequently, since protrusion of the wire harness inward in the vehicle width direction and toward the vehicle upper side can be suppressed, even in a case where the wire harness extends along the rocker, foot space for the occupant can be ensured and the side portion (rocker portion) of the floor portion can be lowered.

A vehicle body lower portion structure pertaining to a second aspect of the present invention is the vehicle body lower portion structure pertaining to the first aspect of the present invention, wherein the connecting wall portion is an inclined wall portion inclined toward a vehicle lower side while heading inward in the vehicle width direction.

According to the vehicle body lower portion structure, the connecting wall portion is an inclined wall portion inclined toward the vehicle lower side while heading inward in the vehicle width direction, so ridgelines are formed where the connecting wall portion connects to the upper wall portion and the inner wall portion. Because of this, the number of ridgelines in the rocker can be increased, and the stiffness of the rocker can be improved. Further, the rocker can be miniaturized in the vehicle up-and-down direction, so the side portion of the floor portion can be lowered even more.

A vehicle body lower portion structure pertaining to a third aspect of the present invention is the vehicle body lower portion structure pertaining to the first or the second aspect of the present invention, further comprising a scuff plate having an upper plate portion that is placed in proximity to a vehicle upper side of the upper wall portion and covers the wire harness from a vehicle upper side.

According to the vehicle body lower portion structure, the upper plate portion of the scuff plate that covers the wire harness from the vehicle upper side is placed in proximity to the vehicle upper side of the upper wall portion. Consequently, even in a ease where the vehicle body lower portion structure is equipped with the scuff plate, since protrusion of the upper plate portion toward the vehicle upper side can be suppressed, the side portion of the floor portion can be lowered.

A vehicle body lower portion structure pertaining to a fourth aspect of the present invention is the vehicle body lower portion structure pertaining to any one of the first to the third aspects of the present invention, wherein the rocker is placed at a vehicle rear side of a front wheel, and a bulkhead that closes off an open portion at a vehicle front side of the rocker is bonded to a front end portion of the rocker.

According to the vehicle body lower portion structure, the bulkhead that closes off the open portion at the vehicle front side of the rocker is bonded to the front end portion of the rocker. Consequently, for example, even if an impactor impacts one end side in the vehicle width direction of the vehicle body from the vehicle front side (that is, an offset collision or a small overlap collision occurs) and the front wheel interferes with the rocker, the impact load from the front wheel can be transmitted to the rocker via the bulkhead.

A vehicle body lower portion structure pertaining to a fifth aspect of the present invention is the vehicle body lower portion structure pertaining to the fourth aspect of the present invention, wherein a projecting portion that projects further outward than a cross section of the front end portion of the rocker as seen in a vehicle front view is formed in the bulkhead.

According to the vehicle body lower portion structure, the projecting portion that projects further outward than the cross section of the front end portion of the rocker as seen in a vehicle front view is formed in the bulkhead that closes off the open portion at the vehicle front side of the rocker. Consequently, since the projecting portion is provided, an area that receives the load from the front wheel becomes larger and the impact load from the front wheel can be efficiently transmitted to the rocker because the projecting portion is one section of the bulkhead and the bulkhead is bonded to the rocker.

A vehicle body lower portion structure pertaining to a sixth aspect of the present invention is the vehicle body lower portion structure pertaining to the fifth aspect of the present invention, wherein a cutout portion is formed by cutting out front end portions of the inner wall portion and the connecting wall portion from a vehicle front side, the bulkhead has a body portion positioned in the cross section of the front end portion of the rocker as seen in a vehicle front view, and the projecting portion projects through the cutout portion from the body portion further outward than the cross section of the front end portion of the rocker.

According to the vehicle body lower portion structure, the cutout portion is formed by cutting out the front end portions of the inner wall portion and the connecting wall portion from the vehicle front side, and the projecting portion projects through the cutout portion further outward than the cross section of the front end portion of the rocker. Consequently, even when the body portion of the bulkhead is contained in the cross section of the front end portion of the rocker as seen in a vehicle front view, the projecting portion can be allowed to project further outward than the cross section of the front end portion of the rocker with the simple structure of forming the cutout portion.

A vehicle body lower portion structure pertaining to a seventh aspect of the present invention is the vehicle body lower portion structure pertaining to the sixth aspect of the present invention, further comprising a dash panel that is disposed in a front portion of the cabin, extends in the vehicle up-and-down direction and the vehicle width direction, and has a vehicle width direction outside end portion bonded to the bulkhead through the cutout portion.

According to the vehicle body lower portion structure, the vehicle width direction outside end portion of the dash panel is bonded to the bulkhead through the cutout portion. Because of this, the stiffness of the support of the vehicle width direction outside end portion of the dash pane, and accordingly, the stiffness of the attachment of the dash panel to the vehicle body, can be improved.

A vehicle body lower portion structure pertaining to an eighth aspect of the present invention is the vehicle body lower portion structure pertaining to any one of the fifth to the seventh aspects of the present invention, further comprising a front pillar that is disposed upright from the rocker and has a flange bonded to the projecting portion.

According to the vehicle body lower portion structure, the front pillar has the flange bonded to the projecting portion. Because of this, the stiffness of the attachment of the front pillar to the vehicle body can be improved.

A vehicle body lower portion structure pertaining to a ninth aspect of the present invention is the vehicle body lower portion structure pertaining to any one of the fifth to the eighth aspects of the present invention, further comprising a side outer panel that covers the rocker from a vehicle width direction outer side and has a flange bonded to the projecting portion.

According to the vehicle body lower portion structure, the side outer panel has the flange bonded to the projecting portion. Because of this, the stiffness of the attachment of the side outer panel to the vehicle body can be improved.

A vehicle body lower portion structure pertaining to a tenth aspect of the present invention is the vehicle body lower portion structure pertaining to any one of the first to the ninth aspects of the present invention, further comprising a reinforcement that is disposed in the floor portion of the cabin at a vehicle width direction inner side with respect to the rocker, extends in the vehicle front-and-rear direction, has a closed cross section as cut along the vehicle width direction, and has a reinforcement upper member and a reinforcement lower member that are divided in the vehicle up-and-down direction.

According to the vehicle body lower portion structure, the reinforcement that extends in the vehicle front-and-rear direction at the vehicle width direction inner side with respect to the rocker is disposed in the floor portion of the cabin. Consequently, in the event of a vehicle frontal collision, the load can be transmitted to the vehicle rear side by the rocker and the reinforcement, and in the event of a vehicle side collision, the advance of the impactor inward in the vehicle width direction can be suppressed by the rocker and the reinforcement.

A vehicle body lower portion structure pertaining to an eleventh aspect of the present invention is the vehicle body lower portion structure pertaining to the tenth aspect of the present invention, wherein the rocker upper member and the reinforcement upper member are integrally formed in a floor panel upper portion, and the rocker lower member and the reinforcement lower member are integrally formed in a floor panel lower portion that configures the floor portion of the cabin together with the floor panel upper portion.

According to the vehicle body lower portion structure, the rocker upper member and the reinforcement upper member are integrally formed in the floor panel upper portion, and the rocker lower member and the reinforcement lower member are integrally formed in the floor panel lower portion. Consequently, an increase in the number of parts can be suppressed, so costs can be reduced.

Advantageous Effects of Invention

As described in detail above, according to the present invention, foot space for the occupant can be ensured and the side portion (rocker portion) of the floor portion can be lowered.

DESCRIPTION OF EMBODIMENT

Figure 1:
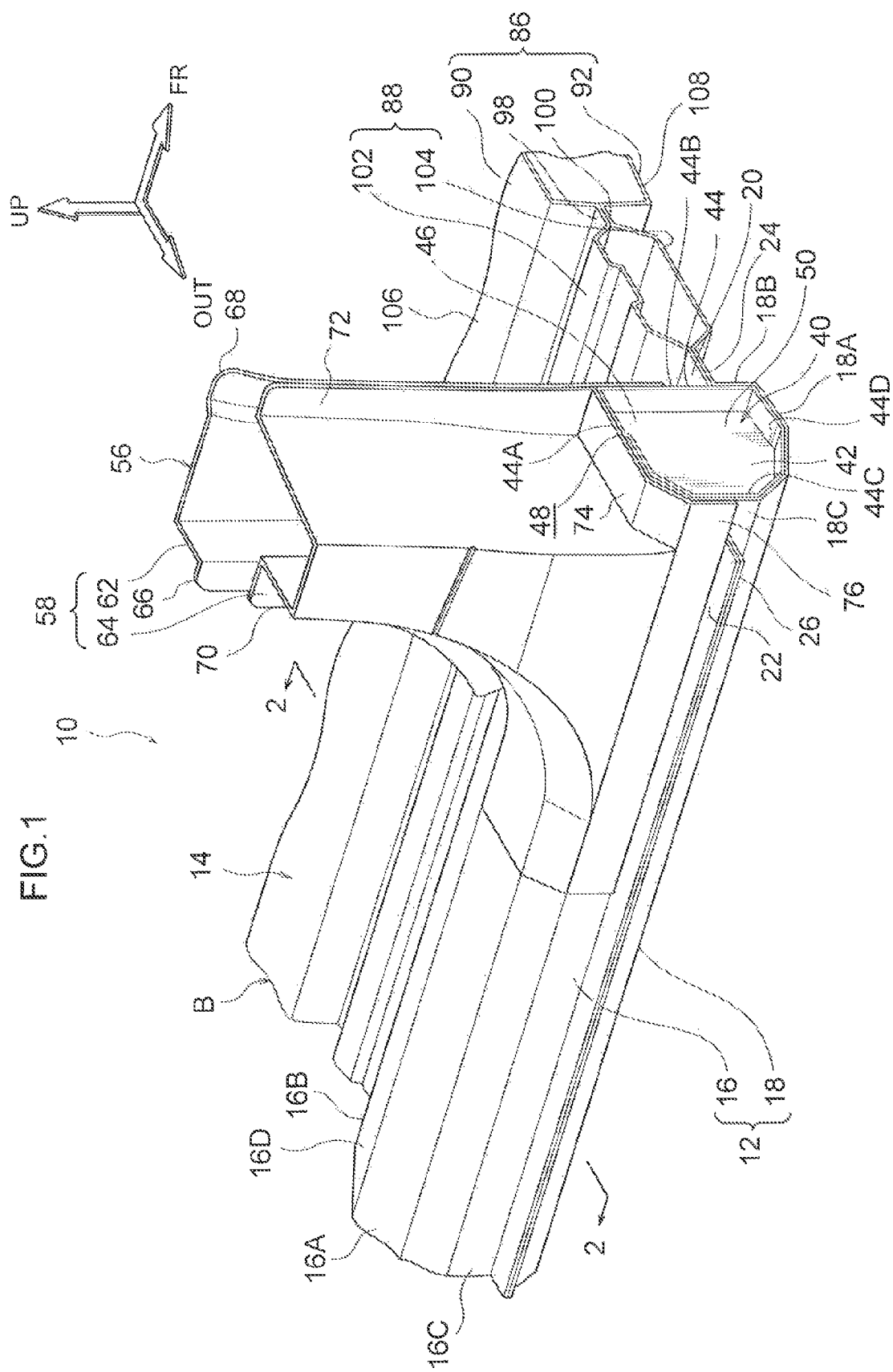
FIG. 1 is a perspective view of a vehicle body lower portion to which a vehicle body lower portion structure pertaining to an embodiment of the present invention has been applied.

An embodiment of the present invention will be described below.

Arrow UP, arrow FR, and arrow OUT shown in the drawings denote an upper side in a vehicle up-and-down direction, a front side in a vehicle front-and-rear direction, and an outer side (right side) in a vehicle width direction, respectively.

Figure 2:
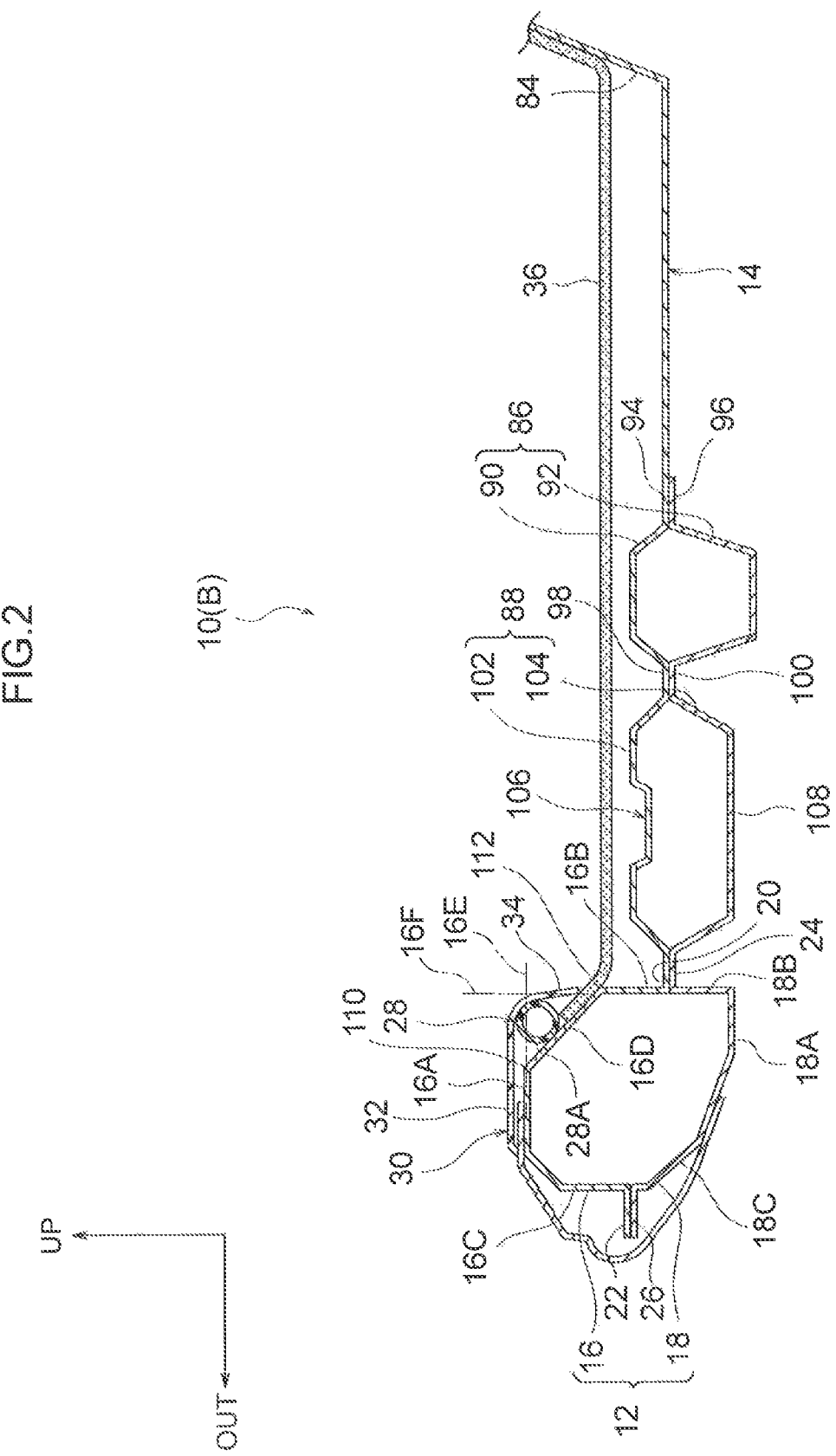
FIG. 2 is a cross-sectional view along line 2-2 of 1.
Figure 3:
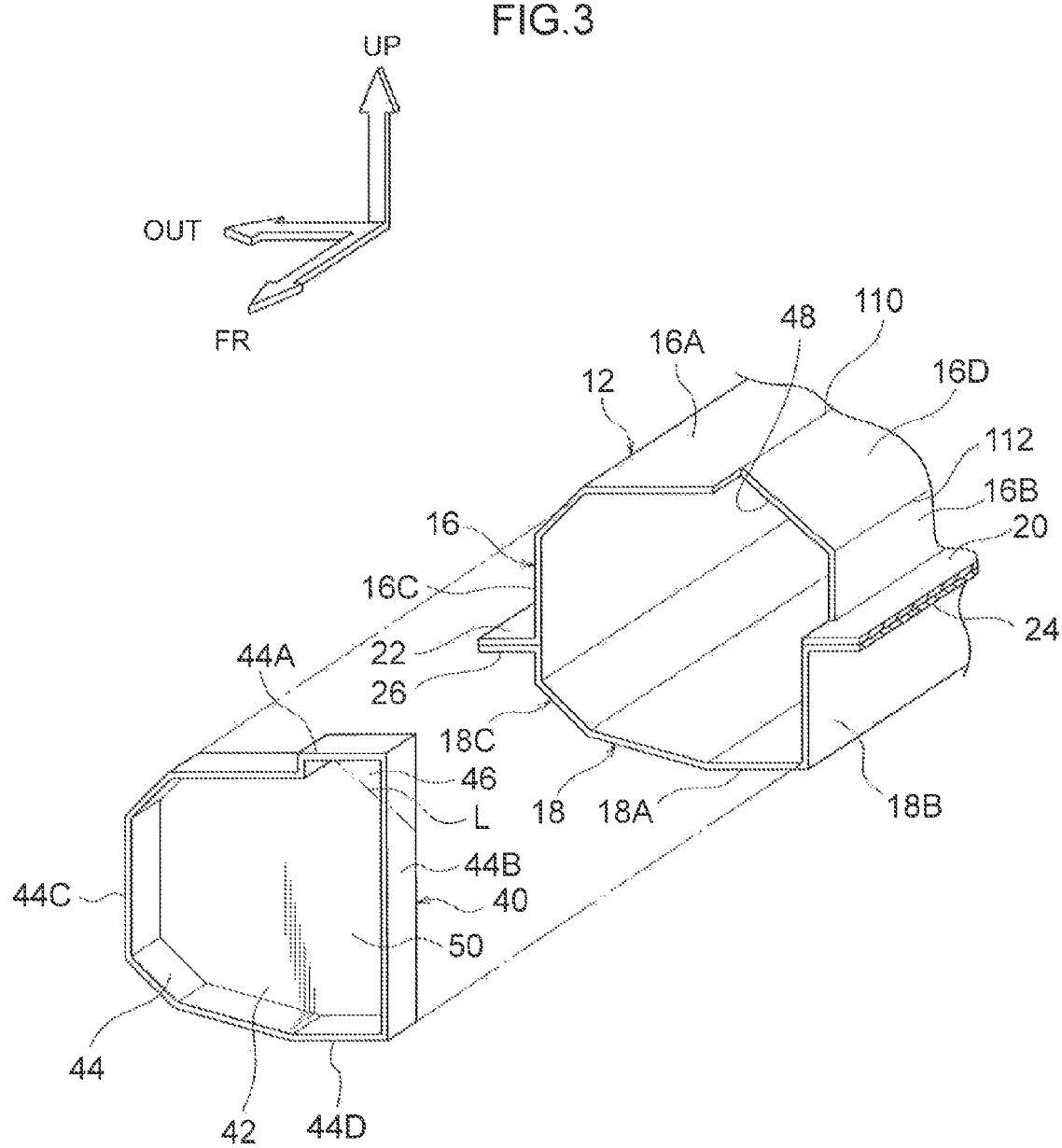
FIG. 3 is an enlarged, exploded perspective view of relevant portions of a rocker and a. bulkhead shown in FIG. 1.

As shown in FIG. 1, a vehicle body lower portion B to which a vehicle body lower portion structure 10 pertaining to the embodiment of the present invention has been applied is equipped with a rocker 12 that extends in the vehicle front-and-rear direction. The rocker 12 is disposed on a side portion of a floor portion 14 of a cabin and has a closed cross section as cut along the vehicle width direction. As shown in FIG. 2 and FIG. 3, the rocker 12 has a rocker upper member 16 and a rocker lower member 18 that are divided in the vehicle up-and-down direction.

The rocker upper member 16 has a convex shape toward a vehicle upper side and configures the upper portion of the rocker 12. The rocker upper member 16 has an upper wall portion 16A, an inner wall portion 16B, an outer wall portion 16C, and a connecting wall portion 16D. The upper wall portion 16A extends in the vehicle width direction, and the inner wall portion 16B is positioned at a vehicle width direction inner side and a vehicle up-and-down direction lower side with respect to the upper wall portion 16A and extends in the vehicle up-and-down direction. The outer wall portion 16C is positioned at a vehicle width direction outer side of the upper wall portion 16 and extends in the vehicle up-and-down direction. An upper portion of the outer wall portion 16C is inclined inward in the vehicle width direction heading toward a vehicle up-and-down direction upper side.

The connecting wall portion 16D is an inclined wall portion extending linearly toward the vehicle lower side while heading inward in the vehicle width direction and interconnects a vehicle width direction inside end portion of the upper wall portion 16A and an upper end portion of the inner wall portion 16B. A flange 20 that extends inward in the vehicle width direction is formed at a lower end portion of the inner wall portion 16B, and a flange 22 that extends outward in the vehicle width direction is formed at a lower end portion of the outer wall portion 16C. Further, as shown in FIG. 3, a cutout portion 48 is formed at a front end portion of the rocker upper member 16 by cutting out a portion of the rocker upper member 16 froth a vehicle front side. More specifically, the cutout portion 48 is formed across a vehicle width direction inside end portion of the upper wall portion 16A, the inner wall portion 16B, the connecting wall portion 16D, the flange 20 and opens to a vehicle front side. Further, the cutout portion 48 has a rectangular shape as seen in a vehicle plan view.

The rocker lower member 18 has a convex shape toward the vehicle lower side and configures a lower portion of the rocker 12. The rocker lower member 18 has a lower wall portion 18A, an inner wall portion 18B, and an outer wall portion 18C. A flange 24 that extends inward in the vehicle width direction is formed at an upper end portion of the inner wall portion 18B, and a flange 26 that extends outward in the vehicle width direction is formed at an upper end portion of the outer wall portion 18C. Further, the outer wall portion 18C is bent inward in the vehicle width direction plural times heading toward the vehicle lower side.

The flange 20 is bonded to the flange 24 in a state in Which the flange 20 is superposed on the flange 24 in the vehicle up-and-down direction, and the flange 22 is bonded to the flange 26 in a state in which the flange 22 is superposed on the flange 26 in the vehicle up-and-down direction. Welding such as spot welding, for example, is used to bond together the flanges 20 and 24 and to bond together the flanges 22 and 26.

Further, as shown in FIG. 2, a wire harness 28 that extends in the vehicle front-and-rear direction along the connecting wall portion 16D of the rocker 12 is disposed at a side portion of the floor portion 14. The wire harness 28 interconnects, for example, a non-illustrated battery disposed in a vehicle body front portion and electrical components disposed in a non-illustrated door or the like disposed at a vehicle body side portion.

A section 28A at a lower side with respect to an upper end portion of the wire harness 28 is positioned, as seen in a vehicle front view, in a cross section formed by the connecting wall portion 16D, an extension line 16E, and an extension line 16F. The extension line 16E extends inward in the vehicle width direction from the upper wall portion 16A, and the extension line 16F extends toward the vehicle upper side from the inner wall portion 16B. This section 28A at the lower side with respect to the upper end portion of the wire harness 28 is an example of a part of a wire harness in the present invention.

Further, a scuff plate 30 that extends in the vehicle front-and-rear direction along the rocker 12 is disposed on the side portion of the floor portion 14. The scuff plate 30 has an upper plate portion 32 that extends in the vehicle width direction and an inner plate portion 34 that extends toward the vehicle lower side from the vehicle width direction inside end portion of the upper plate portion 32. The upper plate portion 32 is placed in proximity to the vehicle upper side of the upper wall portion 16A and covers the wire harness 28 from the vehicle upper side, and the inner plate portion 34 covers the wire harness 28 from the vehicle width direction inner side. The lower end portion of the inner plate portion 34 presses against and secures a vehicle width direction outside end portion of carpet 36 laid on the floor portion 14.

Figure 4:
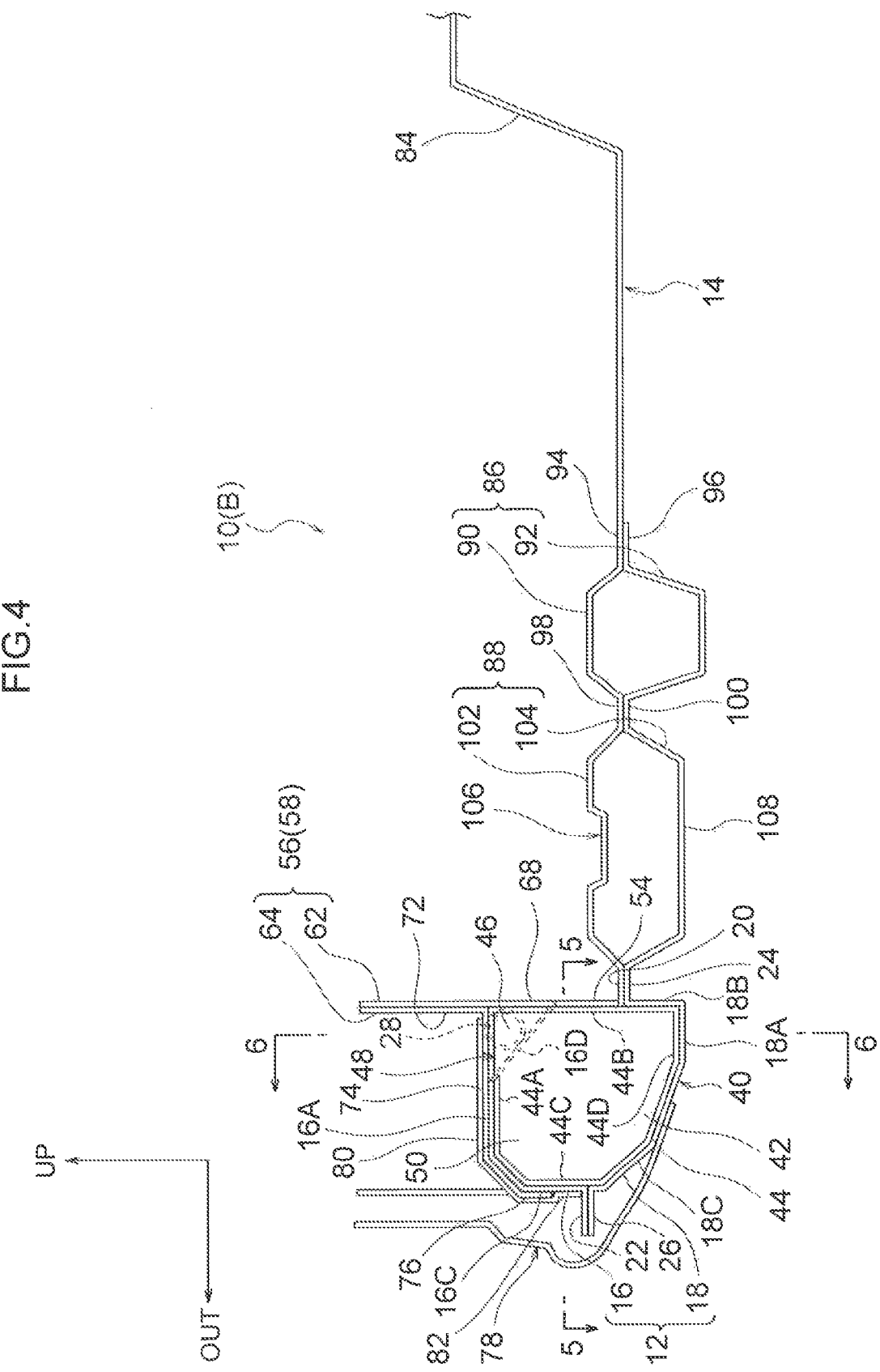
FIG. 4 is a front view of the vehicle body lower portion shown in FIG. 1.

Further, the rocker 12 is placed at a vehicle rear side of a non-illustrated front wheel disposed at a front side portion of the vehicle. Additionally, as shown in FIG. 1 and FIG. 4, a bulkhead 40 is disposed at a front end portion of the rocker 12. The bulkhead 40 has a plate-like portion 42 that intersects (is orthogonal to) a lengthwise direction of the rocker 12 and a frame-like portion 44 that extends toward a vehicle front side from the peripheral edge portions of the plate-like portion 42.

The frame-like portion 44 has an upper wall portion 44A that extends in the vehicle width direction along the upper wall portion 16A of the rocker upper member 16, an inner wall portion 44B that extends toward the vehicle lower side from a vehicle width direction inside end portion of the upper wall portion 44A, an outer wall portion 441 that extends toward the vehicle lower side along the outer wall portions 16C and 18C of the rocker upper member 16 and the rocker lower member 18 from a vehicle width direction outside end portion of the upper wall portion 44A, and a lower wall portion 44D that extends in the vehicle width direction along the lower wall portion 18A of the rocker lower member 18.

As shown in FIG. 4, the upper wall portion 44A is superposed from the vehicle lower side on the upper wall portion 16A of the rocker upper member 16, and the inner wall portion 44B is superposed from the vehicle width direction outer side on the inner wall portion 18B of the rocker lower member 18. Further, the outer wall portion 44C is superposed from the vehicle width direction inner side on the outer wall portions 16C and 18C of the rocker upper member 16 and the rocker lower member 18, and the lower wall portion 44D is superposed from the vehicle upper side on the lower wall portion 18A of the rocker lower member 18.

The upper wall portion 44A, the inner wall portion 44B, the outer wall portion 44C, and the lower wall portion 44D are bonded by spot welding, for example, at appropriate places to the upper wall portion 16A, the inner wall portion 18B, the outer wall portions 16C and 18C, and the lower wall portion 18A, respectively. Additionally, the bulkhead 40 bonded to the front end portion of the rocker 12 in this way closes off the open portion at the vehicle front side of the rocker 12. Further, a projecting portion 46 that projects further outward (inward in the vehicle width direction and toward the vehicle upper side) than the cross section of the front end portion of the rocker 12, as seen in a vehicle front view, is formed in the bulkhead 40.

That is, the cross section of the front end portion of the rocker 12, as seen in a vehicle front view, is configured by the upper wall portion 16A, the inner wall portion 16B, the outer wall portion 16C, and the connecting wall portion 16D of the rocker upper member 16, the lower wall portion 18A the inner wall portion 18B, and the outer wall portion 18C of the rocker lower member 18, and a section surrounded by these wall portions (see also FIG. 3). A section that is positioned at the vehicle width direction inner side and the vehicle upper side with respect to the connecting wall portion 16D, as seen in a vehicle front view, is formed in the bulkhead 40, and this section is the projecting portion 46. The projecting portion 46 coincides with the wire harness 28 as seen in a vehicle front view.

Further, when a portion of the bulkhead 40 contained in the cross section of the front end portion of the rocker 12, as seen in a vehicle front view, (the section that closes off the open portion on the vehicle front side of the rocker 12) is identified as a body portion 50, the projecting portion 46 projects through the cutout portion 48 from the body portion 50 so as to be further outward (inward in the vehicle width direction and toward the vehicle upper side) than the cross section of the front end portion of the rocker 12.

Imaginary line L shown in FIG. 3 indicates a boundary portion between the projecting portion 46 and the body portion 50 and coincides with the connecting wall portion 16D as seen in a vehicle front view. Further, even in a case where an opening such as a positioning hole, for example, is formed in part of the bulkhead 40, the configuration of the bulkhead 40 is such that it closes off the open portion on the vehicle front side of the rocker 12.

Figure 5:
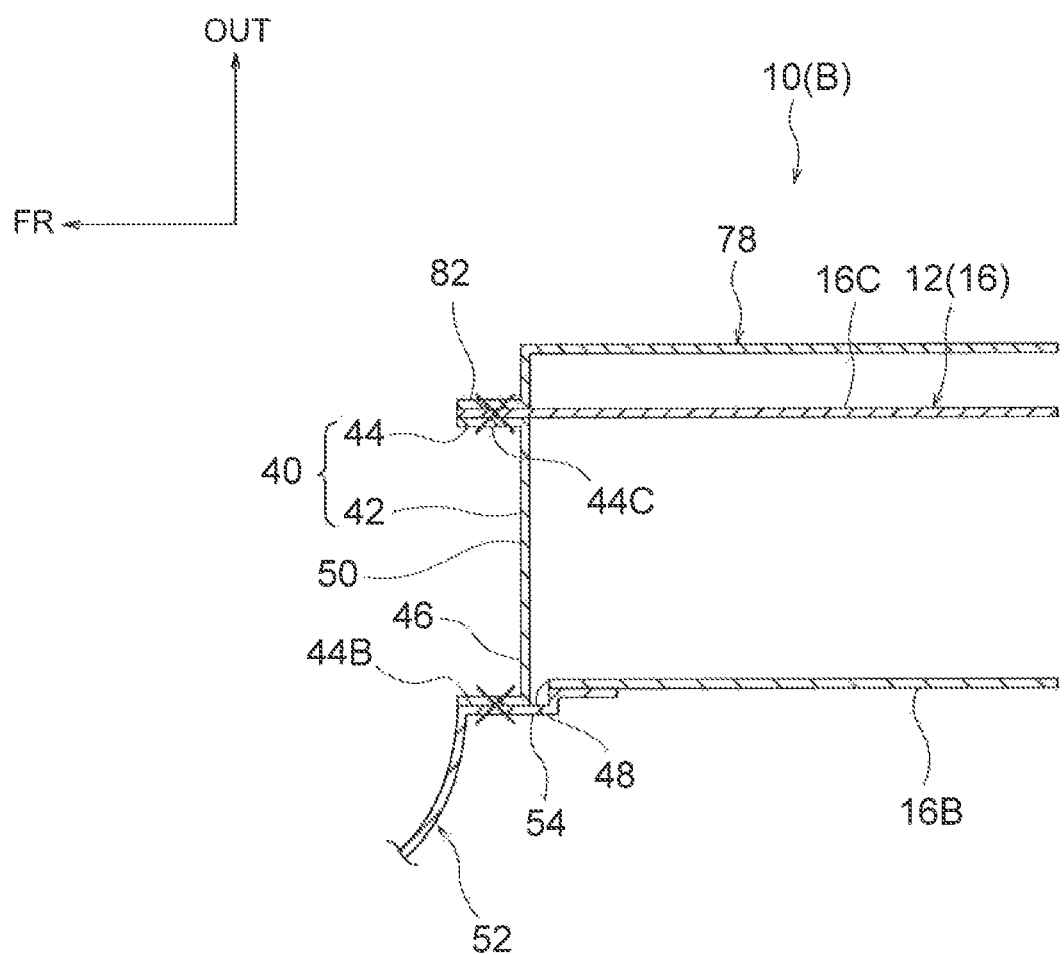
FIG. 5 is a cross-sectional view along line 5-5 of FIG. 4.

Further, as shown in FIG. 5, a dash panel 52 is disposed in a front portion of the cabin. The dash panel 52 extends in the vehicle up-and-down direction and the vehicle width direction and partitions the non-illustrated cabin from an engine compartment. A flange 54 that extends toward a vehicle rear side is formed at a vehicle width direction outside end portion of the dash panel 52.

A front portion of the flange 54 is bonded by spot welding, for example, to the bulkhead 40 (the vehicle up-and-down direction central portion of the inner wall portion 44B of the frame-like portion 44) through the cutout portion 48. The front portion of the flange 54 is an example of a vehicle width direction outside end portion of a dash panel in the present invention. Further, the rear portion of the flange 54 is bonded by spot welding, for example, to the inner wall portion 16B of the rocker upper member 16.

Figure 6:
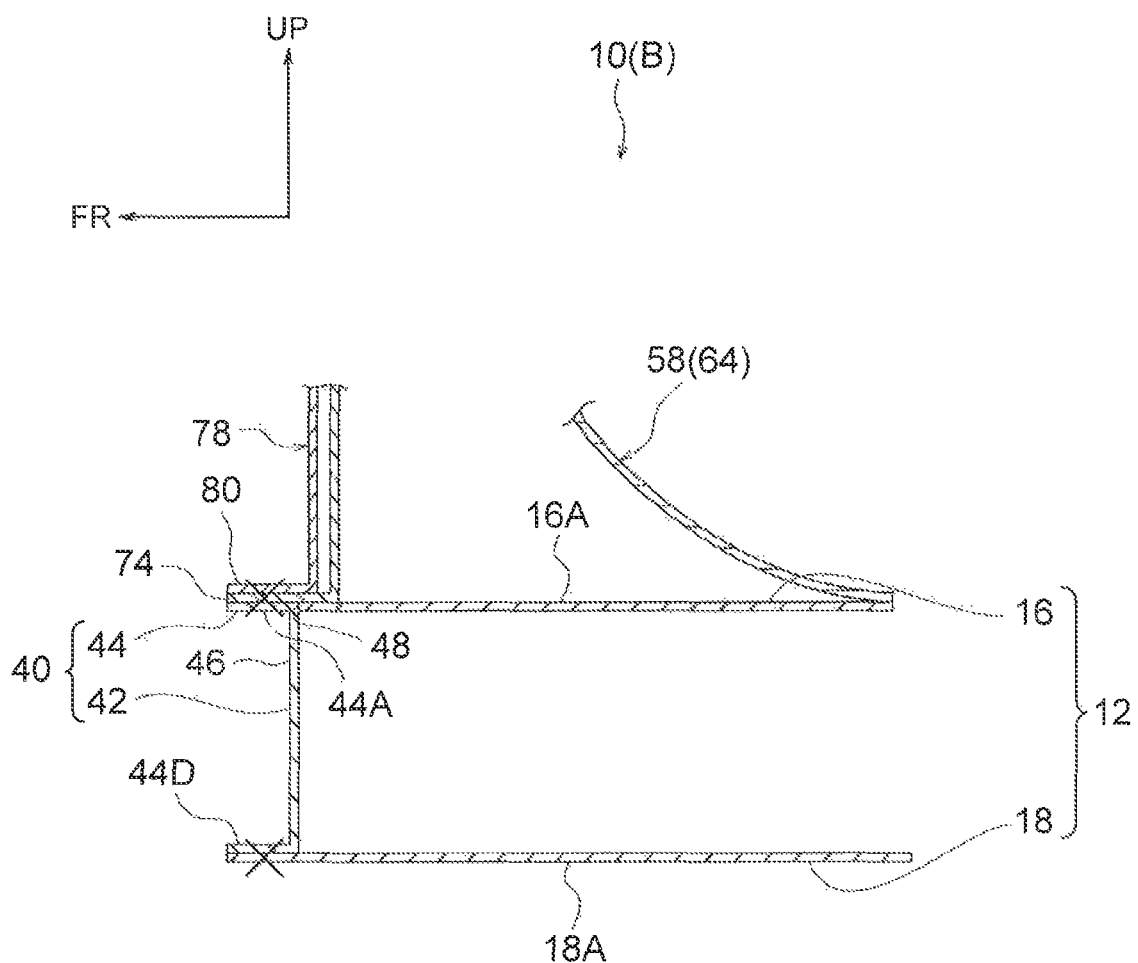
FIG. 6 is a cross-sectional view along line 6-6 of FIG. 4.

Further, as shown in FIG. 1 and FIG. 6, a front pillar 56 that extends in the vehicle up-and-down direction is disposed upright on the front portion of the rocker 12. The front pillar 56 has a front pillar lower member 58 that configures a lower portion of the front pillar 56 and a non-illustrated front pillar upper member that configures an upper portion of the front pillar 56.

As shown in FIG. 1, the front pillar lower member 58 has a front pillar lower inner part 62 and a front pillar lower outer part 64 that are divided in the vehicle width direction. Flanges 66 and 68 whose plate thickness direction coincides with the vehicle width direction and which extend in the vehicle up-and-down direction are formed at the vehicle rear side and front side end portions of the front pillar lower inner part 62. Flanges 70 and 72 whose plate thickness direction coincides with the vehicle width direction and which extend in the vehicle up-and-down direction are formed at the vehicle rear side and front side end portions of the front pillar lower outer part 64.

Additionally, the flanges 66 and 70 as well as the flanges 68 and 72 are bonded together by spot welding, for example, in a state in which they are superposed on top of one another in the vehicle width direction, respectively. Further, as shown in FIG. 4, a lower portion of the flange 68 is bonded by spot welding, for example, to the projecting portion 46 of the bulkhead 40 (the upper portion of the inner wall portion 44B of the frame-like portion 44). The flange 68 is an example of a flange of a front pillar in the present invention.

Further, as shown in FIG. 1 and FIG. 4, a flange 74, whose plate thickness direction coincides with the vehicle up-and-down direction and which extends in the vehicle width direction, and a flange 76, which extends toward the vehicle lower side from a vehicle width direction outer side of the flange 74, are formed at a lower end portion of the front pillar lower outer part 64. The flange 74 is superposed from the vehicle upper side on the projecting portion 46 of the bulkhead 40 (the vehicle width direction inside section of the upper wall portion 44A of the frame-like portion 44) and the upper wall portion 16A of the rocker upper member 16, and the flange 76 is superposed from the vehicle width direction outer side on the outer wall portion 16C of the rocker upper member 16.

Further, the front pillar 56 and the rocker 12 are covered by a side outer panel 78 front the vehicle width direction outer side (see FIG. 4). A flange 80, whose plate thickness direction coincides with the vehicle up-and-down direction and which extends in the vehicle width direction, and a flange 82, which extends toward the vehicle lower side from a vehicle width direction outer side of the flange 80, are formed on the front end portion of the side outer panel 78 (see FIG. 4 and FIG. 6). The flange 80 is superposed from the vehicle upper side on the flange 74. Further, the upper portion of the flange 82 is superposed on the flange 76 from the vehicle width direction outer side, and the lower portion of the flange 82 is superposed from the vehicle width direction outer side on the lower portion of the outer wall portion 16C of the rocker upper member 16.

Additionally, as shown in FIG. 4 and FIG. 6, vehicle width direction inside portions of the flange 74 and the flange 80 are bonded by spot welding, for example, to the projecting portion 46 of the bulkhead 40 (the vehicle width direction inside section of the upper wall portion 44A of the frame-like portion 44). The flange 74 is also an example of a flange of a front pillar in the present invention. Further, the flange 80 is an example of a flange of a side outer panel in the present invention.

Further, as shown in FIG. 4 and FIG. 5, a lower portion of the flange 82 is bonded by spot welding, for example, to the lower portion of the outer wall portion 16C of the rocker upper member 16 and the vehicle up-and-down direction central portion of the outer wall portion 44C of the frame-like portion 44. The rocker 12, the front pillar 56, the bulkhead 40, and the side outer panel 78 are bonded to one another at appropriate places in addition to the places described above.

Further, as shown in FIG. 2 and FIG, 4, a tunnel portion 84 that bulges toward the vehicle upper side is formed in a vehicle width direction central portion of the floor portion 14. Further, a floor reinforcement 86 and an intermediate reinforcement 88 that extend in the vehicle front-and-rear direction are disposed in the floor portion 14 on the vehicle width direction inner side with respect to the rocker 12, that is, between the rocker 12 and the tunnel portion 84. The floor reinforcement 86 and the intermediate reinforcement 88 are an example of reinforcements in the present invention.

The floor reinforcement 86 is disposed in an intermediate portion (more specifically, in a central portion) of the floor portion 14 between the tunnel portion 84 and the rocker 12, and the intermediate reinforcement 88 is disposed in an intermediate portion of the floor portion 14 between the floor reinforcement 86 and the rocker 12. The floor reinforcement 86 and the intermediate reinforcement 88 are placed on the vehicle rear side of a non-illustrated front side member disposed in the vehicle front portion.

Further, the floor reinforcement 86 has a closed cross section as cut along the vehicle width direction and has a floor reinforcement upper member 90 and a floor reinforcement lower member 92 that are divided in the vehicle up-and-down direction. The floor reinforcement upper member 90 configures an upper portion of the floor reinforcement 86 and has a convex shape toward the vehicle upper side. The floor reinforcement lower member 92 configures a lower portion of the floor reinforcement 86 and has a convex shape toward the vehicle lower side.

Flanges 94 and 96 that project inward in the vehicle width direction are formed at vehicle width direction inner sides of the floor reinforcement upper member 90 and the floor reinforcement lower member 92, respectively. The flanges 94 and 96 are bonded together by spot welding, for example, in a state in which they are superposed on top of one another in the vehicle up-and-down direction. Further, flanges 98 and 100 that project outward in the vehicle width direction are formed at vehicle width direction outer sides of the floor reinforcement upper member 90 and the floor reinforcement lower member 92, respectively. The flanges 98 and 100 are bonded together by spot welding, for example, in a state in which they are superposed on top of one another in the vehicle up-and-down direction.

The intermediate reinforcement 88 has a closed cross section as cut along the vehicle width direction and has an intermediate reinforcement upper member 102 and an intermediate reinforcement lower member 104 that are divided in the vehicle up-and-down direction. The intermediate reinforcement upper member 102 configures an upper portion of the intermediate reinforcement 88 and has a convex shape toward the vehicle upper side. The intermediate reinforcement lower member 104 configures a lower portion of the intermediate reinforcement 88 and has a convex shape toward the vehicle lower side.

The intermediate reinforcement upper member 102 is connected to the rocker upper member 16 via the flange 20 and is also connected to the floor reinforcement upper member 90 via the flange 98. The intermediate reinforcement lower member 104 is connected to the rocker lower member 18 via the flange 24 and is also connected to the floor reinforcement lower member 92 via the flange 100.

Further, the floor portion 14 is more specifically configured to have a floor panel upper portion 106 and a floor panel lower portion 108. The floor panel upper portion 106 extends from one end side in the vehicle width direction of the floor portion 14 to the other end side. The rocker upper member 16, the floor reinforcement upper member 90, the intermediate reinforcement upper member 102, and the flanges 20, 22, 94, and 98 are integrally formed in the floor panel upper portion 106.

The floor panel lower portion 108 configures part of the vehicle width direction outer side of the floor portion 14 and is disposed at the vehicle lower side of the floor panel upper portion 106. The rocker lower member 18, the floor reinforcement lower member 92, the intermediate reinforcement lower member 104, and the flanges 24, 26, 96, and 100 are integrally formed in the floor panel lower portion 108.

Next, the action and effects of the embodiment of the present invention will be described.

As described in detail above, according to the vehicle body lower portion structure pertaining to the embodiment of the present invention, the rocker upper member 16A that configures the upper portion of the rocker 12 has the upper wall portion 16A, the inner wall portion 16B that is positioned at the vehicle width direction inner side and the vehicle lower side with respect to the vehicle width direction inside end portion of the upper wall portion 16A, and the connecting wall portion 16D that interconnects the vehicle width direction inside end portion of the upper wall portion 16A and the upper end portion of the inner wall portion 16B. Further, the wire harness 28 extends in the vehicle front-and-rear direction along the rocker 12, and the section 28A at the lower side with respect to the upper end portion of the wire harness 28 is positioned, as seen in a vehicle front view, in the cross section formed h the connecting wall portion 16D, the extension line 16E and the extension line 16F. The extension line 16E extends inward in the vehicle width direction from the upper wall portion 16A, and the extension line 16F extends toward the vehicle upper side from the inner wall portion 16B.

Consequently, since protrusion of the wire harness 26 inward in the vehicle width direction and toward the vehicle upper side can be suppressed, even in a case where the wire harness 28 extends along the rocker 12, foot space for the occupant can be ensured and the side portion (rocker portion) of the floor portion 14 can be lowered.

Moreover, the rocker 12 has the rocker upper member 16 and the rocker lower member 18 that are divided in the vehicle up-and-down direction. Consequently, a situation where flanges for bonding together the rocker upper and lower members 16 and 18 project in the vehicle up-and-down direction can be avoided and the side portion of the floor portion 14 can be further lowered.

Further, the connecting wall portion 16D is an inclined wall portion extended toward the vehicle lower side while heading inward in the vehicle width direction, so ridgelines 110 and 112 are formed where the connecting wall portion 16D connects to the upper wall portion 16A and the inner wall portion 16B. Because of this, the number of ridgelines in the rocker 12 can be increased and the stiffness of the rocker 12 can be increased. Further, the rocker 12 can be miniaturized in the vehicle up-and-down direction, so the side portion of the floor portion 14 can be lowered even more.

Further, the upper plate portion 2 of the scuff plate 30 that covers the wire harness 28 from the vehicle upper side is placed in proximity to the vehicle upper side of the upper wall portion 16A. Consequently, even in a case where the vehicle body lower portion structure 10 is equipped with the scuff plate 30, protrusion of the upper plate portion 32 toward the vehicle upper side can be suppressed and the side portion of the floor portion 14 can be lowered.

Further, the bulkhead 40 that closes off the open portion at the vehicle front side of the rocker 12 is bonded to the front end portion of the rocker 12. Consequently, for example, even if an impactor impacts one end side in the vehicle width direction of the vehicle body from the front side (that is, an offset collision or a small overlap collision occurs) and the front wheel interferes with the rocker 12, the impact load from the front wheel can be transmitted to the rocker 12 via the bulkhead 40.

Further, the projecting portion 46 that projects further outward than the cross section of the front end portion of the rocker 12, as seen in a vehicle front view, is formed in the bulkhead 40 that closes off the open portion on the vehicle front side of the rocker 12. Consequently, due to the projecting portion 46 being formed, an area that receives a load from the front wheel becomes larger and an impact load from the front wheel can be efficiently transmitted to the rocker 12 because the projecting portion 46 is one section of the bulkhead 40 and the bulkhead 40 is bonded to the rocker 12.

Further, the projecting portion 46 coincides with the wire harness 28 as seen in a vehicle front view, so even in the event of the offset collision or the small overlap collision mentioned above, the wire harness 28 can be protected by the projecting portion 46.

Further, the cutout portion 48 (see FIG. 3) is thrilled in the front end portions of the inner wall portion 16B and the connecting wall portion 16D by cutting out from the vehicle front side, and as shown in FIG. 4, the projecting portion 46 projects further outward than the cross section of the front end portion of the rocker 12 through the cutout portion 48. Consequently, even when the body portion 50 of the bulkhead 40 is contained within the cross section of the front end portion of the rocker 12 as seen in a vehicle front view, the projecting portion 46 can be allowed to project further outward than the cross section of the front end portion of the rocker 12 with the simple structure of forming the cutout portion 48.

Further, the front portion of the flange 54 formed at the vehicle width direction outside end portion of the dash panel 52 is bonded to the bulkhead 40 (the vehicle up-and-down direction central portion of the inner wall portion 44B of the frame-like portion 44) through the cutout portion 48. Because of this, the stiffness of the support of the vehicle width direction outside end portion of the dash panel 52, and therefore the stiffness of the attachment of the dash panel 52 to the vehicle body can be improved.

Further, the front pillar 56 has the flange 68 and the flange 74. The flange 68 is bonded to the upper portion of the inner wall portion 44B of the frame-like portion 44 configuring the projecting portion 46, and the flange 74 is bonded to the vehicle width direction inside portion of the upper wall portion 44A of the frame-like portion 44 configuring the projecting portion 46. Because of this, the stiffness of the attachment of the front pillar 56 to the vehicle body can be improved.

Likewise, the side outer panel 78 has the flange 80 bonded to the vehicle width direction inside section of the upper wall portion 44A of the frame-like portion 44 configuring the projecting portion 46. Because of this, the stiffness of the attachment of the side outer panel 78 to the vehicle body can also be improved.

Further, the floor reinforcement 86 and the intermediate reinforcement 88 that extend in the vehicle front-and-rear direction at the vehicle width direction inner side with respect to the rocker 12 are disposed in the floor portion 14. Consequently, in the event of a vehicle frontal collision, the load can be transmitted to the vehicle rear side by the three structural members of the rocker 12, the floor reinforcement 86, and the intermediate reinforcement 88, and in the event of a vehicle side collision, the advance of the impactor inward in the vehicle width direction can be suppressed by these three structural members.

Further, the rocker upper member 16, the floor reinforcement upper member 90, and the intermediate reinforcement upper member 102 are integrally formed in the floor panel upper portion 106, and the rocker lower member 18, the floor reinforcement lower member 92, and the intermediate reinforcement lower member 104 are integrally formed in the floor panel lower portion 108. Consequently, an increase in the number of pats can be suppressed, so costs can be reduced.

Next, modifications of the embodiment of the present invention will be described.

In the embodiment of the present invention, part of the wire harness 28 (the section 28A at the lower side than the upper end portion) is positioned, as seen in a vehicle front view, in the cross section. formed by the connecting wall portion 16D, the extension line 16E extending inward in the vehicle width direction from the upper wall portion 16A, and the extension line 16F extending toward the vehicle upper side from the inner wall portion 16B. However, the entire wire harness 28 may also be positioned in the cross section. Further, another part of the wire harness 28 may also be positioned in the cross section.

Further, the connecting wall portion 16D is formed by an inclined wall portion in such a way that the ridgelines 110 and 112 are formed where the connecting wall portion 16D connects to the upper wall portion 16A and the inner wall portion 16B, but the connecting wall portion 16D may also have another shape as long as at least part of the wire harness 28 is positioned in the cross section.

Further, the front pillar 56 has the flanges 68 and 74 bonded to the projecting portion 46, but the front pillar 56 does not have to be bonded to the projecting portion 46. Further, just either one of the flange 68 and the flange 74 may also be bonded to the projecting portion 46.

Further, the flange 80 formed at the front end portion of the side outer panel 78 is bonded, via the flange 74 formed at the lower end portion of the front pillar lower outer 64, to the vehicle width direction inside section of the upper wall portion 44A of the frame-like portion 44 configuring the projecting portion 46, but the flange 80 may also be directly bonded to this section.

Further, the cutout portion 48 is formed in the inner wall portion 16B and the connecting wall portion 16D, but the cutout portion 48 may also be formed across the upper wall portion 16A, the inner wall portion 16B, and the connecting wall portion 16D.

Further, the floor reinforcement 86 and the intermediate reinforcement 88 are disposed in the floor portion 14, but just either one of these may also be disposed.

Further, the rocker 12, the floor reinforcement 86, and the intermediate reinforcement 88 are disposed in the floor portion 14 as a result of being integrally formed in the floor portion 14, but they may also be configured separately from the floor portion 14 and disposed in the floor portion 14 as a result of being bonded to the floor portion 14.

Further, the connecting wall portion 16D interconnects the vehicle width direction inside end portion of the upper wall portion 16A and the upper end portion of the inner wall portion 16B, but in a reference example, the connecting wall portion 16D may also be an inclined wall portion extending linearly toward the vehicle lower side heading inward in the vehicle width direction, so that the connecting wall portion 16D interconnects the vehicle width direction inside end portion of the upper wall portion 16A and the vehicle width direction outside end portion of the flange 20.

An embodiment of the present invention has been described above, but the present invention is not limited to the above and can be modified and implemented in various ways without departing from the gist thereof.

Next, the technical feature that can be grasped from the embodiment outside the invention described in the claims will be described below together with its effects.

A vehicle body lower portion structure comprising: a rocker upper member that configures an upper portion of a rocker that is disposed on a side portion of a floor portion of a cabin, is placed on a vehicle rear side of a front wheel, extends in a vehicle front-and-rear direction, and has a dosed cross section as cut along a vehicle width direction, the rocker upper member having an upper wall portion that extends in the vehicle width direction, an inner wall portion that is positioned on a vehicle width direction inner side and a vehicle lower side with respect to the upper wall portion and extends in a vehicle up-and-down direction, and a connecting wall portion that interconnects a vehicle width direction inside end portion of the upper wall portion and an upper end portion of the inner wall portion; a rocker lower member that configures a lower portion of the rocker; and a bulkhead that has a body portion and a projecting portion. The body portion is placed in a cross section of a front end portion of the rocker as seen in a vehicle front view and closes off an open portion at a vehicle front side of the rocker. The projecting portion projects through a cutout portion from the body portion further outward than the cross section of the front end portion of the rocker. The cutout portion is made by cutting out the front end portions of the inner wall portion and the connecting wall portion from a vehicle front side. The bulkhead is bonded to the front end portion of the rocker.

According to this vehicle body lower portion structure, the bulkhead that closes off the open portion at the vehicle front side of the rocker is bonded to the front end portion of the rocker. Consequently, for example, even if an impactor impacts one end side in the vehicle width direction of the vehicle body from the vehicle front side (that is, an offset collision or a small overlap collision occurs) and the front wheel interferes with the rocker, the impact load from the front wheel can be transmitted to the rocker via the bulkhead.

Moreover, the projecting portion that projects further outward than the cross section of the front end portion of the rocker, as seen in a vehicle front view, is formed in the bulkhead that closes off the open portion at the vehicle front side of the rocker therefore, due to the projecting portion being formed, the impact load from the front wheel can be efficiently transmitted to the rocker.

Further, the cutout portion is formed by cutting out the inner wall portion and the connecting wall portion from the vehicle front side, and the projecting portion projects further outward than the cross section of the front end portion of the rocker through the cutout portion. Consequently, even when the body portion of the bulkhead is contained in the cross section of the front end portion of the rocker as seen in a vehicle front view, the projecting portion can be allowed to project further outward than the cross section of the front end portion of the rocker with the simple structure of forming the cutout portion.

The invention claimed is:

1. A vehicle body lower portion structure comprising:
   a rocker upper member that configures an upper portion of a rocker that is disposed at a side portion of a floor portion of a cabin, extends in a vehicle front-and-rear direction, and has a dosed cross section as cut along a vehicle width direction, the rocker upper member having an upper wall portion that extends in the vehicle width direction, an inner wall portion that is positioned at a vehicle width direction inner side and a vehicle lower side with respect to the upper wall portion and extends in a vehicle up-and-down direction, and a connecting wall portion that interconnects a vehicle width direction inside end portion of the upper wall portion and an upper end portion of the inner wall portion;
   a rocker lower member that configures a lower portion of the rocker; and
   a wire harness that extends in the vehicle front-and-rear direction along the rocker, with at least part of the wire harness being positioned, as seen in a vehicle front view, in a cross section formed by the connecting wall portion, an extension line extending inward in the vehicle width direction from the upper wall portion, and an extension line extending toward a vehicle upper side from the inner wall portion wherein:
   a bulkhead that closes off an open portion at a vehicle front side of the rocker is bonded to a front end portion of the rocker;
   a projecting portion that projects further outward than a cross section of the front end portion of the rocker as seen in the vehicle front view is formed in the bulkhead;
   a cutout portion is formed by cutting out front end portions of the inner wail portion and the connecting wall portion from a vehicle front side;
   the bulkhead has a body portion positioned in the cross section of the front end portion of the rocker as seen in the vehicle front view; and
   the projecting portion projects through the cutout portion from the body portion further outward than the cross section of the front end portion of the rocker.

2. The vehicle body lower portion structure according to claim 1, wherein the connecting wall portion is an inclined wall portion inclined toward a vehicle lower side heading inward in the vehicle width direction.

3. The vehicle body lower portion structure according to claim 1, further comprising a scuff plate having an upper plate portion that is placed in proximity to a vehicle upper side of the upper wall portion and covers the wire harness from the vehicle upper side.

4. The vehicle body lower portion structure according to claim 1, further comprising a dash panel that is disposed in a front portion of the cabin, extends in the vehicle up-and-down direction and the vehicle width direction, and has a vehicle width direction outside end portion bonded to the bulkhead through the cutout portion.

5. The vehicle body lower portion structure according to claim 1, further comprising a front pillar that is disposed upright from the rocker and has a flange bonded to the projecting portion.

6. The vehicle body lower portion structure according to claim 1, further comprising a side outer panel that covers the rocker from a vehicle width direction outer side and has a flange bonded to the projecting portion.

7. The vehicle body lower portion structure according to claim 1, further comprising a reinforcement that is disposed in the floor portion of the cabin on a vehicle width direction inner side with respect to the rocker, extends in the vehicle front-and-rear direction, has a closed cross section as cut along the vehicle width direction, and has a reinforcement upper member and a reinforcement lower member that are divided in the vehicle up-and-down direction.

8. The vehicle body lower portion structure according to claim 7, wherein the rocker upper member and the reinforcement upper member are integrally formed in a floor panel upper portion, and the rocker lower member and the reinforcement lower member are integrally formed in a floor panel lower portion that configures the floor portion of the cabin together with an intermediate reinforcement lower member.

\* \* \* \* \*